(12) United States Patent
Wilcox et al.

(10) Patent No.: US 6,570,702 B2
(45) Date of Patent: May 27, 2003

(54) ANTIGUIDED FIBER RIBBON LASER

(75) Inventors: Russel B. Wilcox, El Cerrito, CA (US); Ralph H. Page, Castro Valley, CA (US); Raymond J. Beach, Livermore, CA (US); Michael D. Feit, Livermore, CA (US); Stephen A. Payne, Castro Valley, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 09/793,820

(22) Filed: Feb. 16, 2001

(65) Prior Publication Data

US 2002/0024727 A1 Feb. 28, 2002

Related U.S. Application Data

(60) Provisional application No. 60/197,787, filed on Apr. 14, 2000.

(51) Int. Cl.[7] .............................. H04B 10/12; H01S 3/30; G02B 6/02; G02B 6/00
(52) U.S. Cl. .................. 359/341.1; 359/342; 372/6; 372/3; 385/123; 385/141
(58) Field of Search .................... 359/333, 341.3; 372/3, 6; 385/114, 144, 142, 123

(56) References Cited

U.S. PATENT DOCUMENTS

| | | | | |
|---|---|---|---|---|
| 4,185,890 A | * | 1/1980 | Onoda et al. | 385/124 |
| 4,206,967 A | * | 6/1980 | Onoda et al. | 385/127 |
| 4,348,763 A | * | 9/1982 | Ackley et al. | 372/45 |
| 4,349,905 A | | 9/1982 | Ackley | 372/46 |
| 4,435,040 A | * | 3/1984 | Cohen et al. | 385/127 |
| 4,676,584 A | * | 6/1987 | Perlin | 385/32 |
| 4,691,990 A | * | 9/1987 | Cohen et al. | 385/127 |
| 4,940,303 A | * | 7/1990 | Abeles et al. | 372/24 |
| 5,272,711 A | * | 12/1993 | Mawst et al. | 372/45 |
| 5,323,405 A | * | 6/1994 | Kamiyama et al. | 372/18 |
| 5,539,759 A | * | 7/1996 | Chang-Hasnain et al. | 372/102 |
| 5,566,196 A | | 10/1996 | Scifres | 372/6 |
| 5,802,236 A | * | 9/1998 | DiGiovanni et al. | 385/125 |
| 5,822,489 A | * | 10/1998 | Hale | 372/6 |
| 5,838,868 A | * | 11/1998 | Krol et al. | 385/127 |
| 5,923,694 A | * | 7/1999 | Culver | 372/69 |
| 5,930,280 A | * | 7/1999 | Rossi et al. | 372/103 |
| 5,949,941 A | * | 9/1999 | DiGiovanni et al. | 359/345 |

(List continued on next page.)

OTHER PUBLICATIONS

Botez, D. "high–power monolithic phase–locked arrays of antiguided semiconductor diode lasers." IEE Proceedings–J. 139:1, Feb., 1992, pp. 14–23.*

Romanova, E.A. et al. "Light Propagation in optical anti–guided structures with Kerr–like nonlinearity." ICTON'99, Jun. 1999, pp. 251–254.*

(List continued on next page.)

Primary Examiner—Thomas G. Black
Assistant Examiner—Andrew R. Sommer
(74) Attorney, Agent, or Firm—John P. Wooldridge; Alan H. Thompson

(57) ABSTRACT

The invention is a ribbon of an optical material with a plurality of cores that run along its length. The plurality of cores includes lasing impurity doped cores in an alternating spaced arrangement with index-modifying impurity doped cores. The ribbon comprises an index of refraction that is substantially equal to or greater than the indices of refraction of said array of lasing impurity doped cores. Index-increasing impurity doped cores promote antiguiding and leaky modes which provide more robust single "supermode" operation.

25 Claims, 6 Drawing Sheets

U.S. PATENT DOCUMENTS

| | | | | | |
|---|---|---|---|---|---|
| 5,966,491 | A | * | 10/1999 | DiGiovanni | 372/6 |
| 6,031,850 | A | * | 2/2000 | Cheo | 372/6 |
| 6,052,392 | A | * | 4/2000 | Ueda et al. | 372/6 |
| 6,407,852 | B1 | * | 6/2000 | Lange et al. | 359/333 |
| 6,134,364 | A | * | 10/2000 | DeFabritis et al. | 385/114 |
| 6,167,075 | A | * | 12/2000 | Craig et al. | 372/32 |
| 6,229,939 | B1 | * | 5/2001 | Komine | 372/6 |
| 6,253,013 | B1 | * | 6/2001 | Lochkovic et al. | 385/114 |
| 6,288,835 | B1 | * | 9/2001 | Nilsson et al. | 359/341.3 |
| 6,324,326 | B1 | * | 11/2001 | Dejneka et al. | 359/341.1 |
| 6,459,068 | B1 | * | 10/2002 | Yamaura et al. | 219/121.6 |

OTHER PUBLICATIONS

Hadley, G.R. et al. "Modal Discrimination in Leaky–Mode (Antiguided) Arrays." IEEE J. Quantum Electronics, 27:4, Apr. 1991, pp. 921–930.*

Dong, J. et al. "Single Mode Multiple–Element LAser Array with Grating Filter." IEEE J. Quantum Electronics, 29:7, Jul. 1993, pp. 2163–2172.*

Zmudzinski, C. et al. "Three–Core ARROW–Type Diode Laser: Novel High–Power, Single–Mode Device, and Effective Master Oscillator for Flared Antiguided MOPA's." IEE J. Selected Topics On Quanum Electronics. 1:2, Jun. 1992, pp. 129–137.*

Takayama, T. et al. "Low–noise and high–power real reflective index guided laser array." Elect Lett. 30:16, Aug. 1994, pp. 1307–1308.*

Mawst, L.J. et al. "1.5 W Diffraction–Limited–Beam operation from resonant–optical–waveguide (ROW) Array." Elect. Lett. 27:4, Feb. 1991, pp. 369–371,*

Shiau, T.H. et al. "Strained Quantum Well Leaky–Mode Diode Laser Arrays." LEOS 1990, Nov. 1990, 418–419.*

Paiss, I and Hardy, A. "Influence of External mirror on Modal Behavior of Twin–Stripe Index–Guided Injection Lasers." J. Lightwave Tech. 9:4, Apr. 1991, pp. 531–534.*

Botez, D et al. "High–power Monolithic Phase–locked Diode–LAser Arrays of Antiguides." LEOS'90 Nov. 1990, pp. 414–417.*

* cited by examiner

ANTIGUIDED FIBER RIBBON LASER

This application claims priority to Provisional Patent Application Serial No. 60/197,787, titled "Antiguided Fiber Ribbon Laser," filed Apr. 14, 2000, incorporated herein by reference.

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to waveguides and fiber optics, and more specifically, it relates to techniques for combining the output of a fiber optic array to provide a coherent array of beams that are phase locked together.

2. Description of Related Art

The average power of fiber lasers has been increasing in the last few years due to the advent of "cladding pumping" where the pump light is introduced into an inner cladding which surrounds the core, and which in turn is surrounded by a low index outer cladding. These devices have produced in excess of 100 Watts to date, but are ultimately limited in power by their small output aperture and the requirement that the fiber core only support one transverse mode.

Diode arrays have been phase locked together to increase their collective output power by employing a form of index guiding referred to as "antiguiding." Index guiding is referred to as antiguiding when the refractive index is lowest in the regions aligned with the gain elements, and rises to a higher value or remains the same between elements. Since the light in the lower refractive index material leaks out of the lasing element regions, the term leaky-mode laser array is sometimes applied. A leaky-mode array is described in "High-Power Leaky Mode Multiple-Stripe Laser," by D. E. Ackley and R. W. H. Englemann, Appl. Phys. Lett. 39(1), Jul. 1, 1981. A leaky-mode array is described in U.S. Pat. No. 4,348,763 titled "Multiple Stripe Leaky Mode Laser" incorporated herein by reference.

It would be desirable if a device utilizing the antiguiding technique could be used to combine the output of a fiber optic array. The present invention provides embodiments of such a device.

SUMMARY OF THE INVENTION

It is an object of the present invention to provide an antiguided fiber ribbon light amplifier and laser.

It is another object of the present invention to provide a scalable technique for generating kilowatts of power from a multicore phase locked aperture with high spatial and temporal coherence.

These and other objects will be apparent to those skilled in the art based on the disclosure herein.

The invention is a silica or other glass based fiber (such as fluoride or phosphate glass) that includes a core structure comprising an array of cores arranged in a spaced arrangement within a secondary waveguide region. Some of the cores are doped with a lasing impurity, and the remaining areas may be doped with refractive index-adjusting impurities. The doping of these adjacent regions is designed such as to promote "antiguiding" and "leaky modes" which provide for more robust single "supermode" operation. The ribbon laser may be pumped from the side with a laser diode bar, may be used as an oscillator or amplifier, and provides high power operation.

The fiber contains multiple doped cores in an array, with adjacent elements to keep the cores' outputs coherently phased together. The cores can be arranged in a line, so as to be guided within a long aspect ratio rectangle, or ribbon. The multiple cores can be surrounded by an outer cladding that guides the pump light. One embodiment includes a cross-section of a 5-core ribbon, with a pump-guiding cladding structure surrounding the antiguided wave region. The antiguided region in this embodiment comprises Yb:silica and Ge:silica and the pump cladding comprises silica. Similar ribbon structures can be envisioned using phosphate glass as the base material. The ribbon is surrounded or embedded within a polymer coating.

In another embodiment, each core of 100 single mode cores is about 8 microns in diameter, with the cores uniformly distributed in a ribbon cladding structure that is 10 microns high by 2 mm wide. With this configuration, the optimum placement of laser diode bars is at a spacing of every 50 cm along the length of the ribbon for a core doping concentration of $1 \times 10^{20}/cm^3$. The diodes can be coupled into the pump cladding using either prism couplers or diffraction gratings on the side of the ribbon structure. A five core embodiment is described and includes a low refractive index silica cladding to act as end mirrors to confine the wave laterally.

The proposed ribbon lasers can use a side-pumping scheme, with pumps placed periodically along the fiber. A laser diode bar is coupled into the outer cladding with a phase grating. Pump light from the diode bar propagates through the outer cladding to optically excite the laser impurity doped cores within the core structure. The core structure comprises laser impurity doped cores and index-increasing impurity doped cores. In an embodiment that utilizes the spaced diode pumping, a single fiber ribbon is wrapped around a pipe or mandrel. The ribbon includes laser diode bars periodically spaced along the length of the ribbon and water is flowed though the pipe or mandrel to provide cooling. One of the advantages of the ribbon structures proposed here is that they are very amenable to uniform thermal management. Because the heat generated in one gain loaded core exits in the ribbon structure without having to flow through another gain loaded core, all cores see the same temperature. Because cores at varying temperatures could impart varying phase differentials to the radiation traversing them, this is an important consideration in a device that is being designed to operate with a controlled phase across its aperture. For example, uniform temperatures would not exist across multiple gain loaded cores arranged in a two-dimensional pattern that filled an area—a geometry that is presently popular with many of the so called photonic crystal fiber structures. For these devices, the cores in the center of the structure will be hotter than the cores in the perimeter of the structure due to their longer distance from any heat sink. One possible variation of the ribbon structure that is not a linear array, but nonetheless preserves the desirable property of having all gain cores see the same thermal environment, consists of a large circular pump cladding with gain cores located sequentially around the inside perimeter of the structure. If such a structure is cooled over its circumference, then all gain cores will see the same thermal environment.

DETAILED DESCRIPTION OF THE INVENTION

The invention is a thin, wide silica fiber, or "ribbon," which has as its core structure a linear array of cores arranged along the width of the ribbon. Some of the cores are doped with a lasing impurity, and others may be doped with index-modifying impurities. The doping of these adjacent cores is designed such as to promote "antiguiding" or "leaky modes" which provide more robust single "supermode" operation. Another aspect of the invention is that the ribbon laser is pumped from the side with a simple optical arrangement that doesn't require intensification of the pump laser diode output. This ribbon laser can be used as an oscillator or amplifier, and provides high power operation, many times higher than possible with single core fibers.

The fiber contains multiple doped cores in a linear array, with adjacent elements to keep the cores' individual outputs coherently phased together. These are "antiguided" gain elements in a "leaky waveguide" array, analogous to the most successful scheme for phasing laser diode elements (See D. Botez and D. R. Scifres, "Diode Laser Arrays", Cambridge Univ. Press 1994). This is superior to evanescently coupled cores, which has been pursued by other researchers. The cores are arranged in a line, making the fiber a long aspect ratio rectangle, or "ribbon". The multiple cores are housed in a cladding that guides the pump light, analogous to current "cladding-pumped" fibers, currently capable of over 60 Watts per single mode core. The predicted limit is around 100 Watts per core. Scaling consists of increasing the number of coherently phased cores. One embodiment provides 5 cores. One ribbon will thus produce 500 Watts, useful for laser welding and materials-processing. The invention encompasses ribbons with larger numbers of cores as well. One design is shown in FIG. 1.

It is possible to arrange the antiguided region in alternative ways, for example as an annulus, or as a two-dimensional structure. The refractive indices in the waveguide must be set to promote antiguiding in order for the cores to be effectively phase-locked to one another.

Figure 1A:
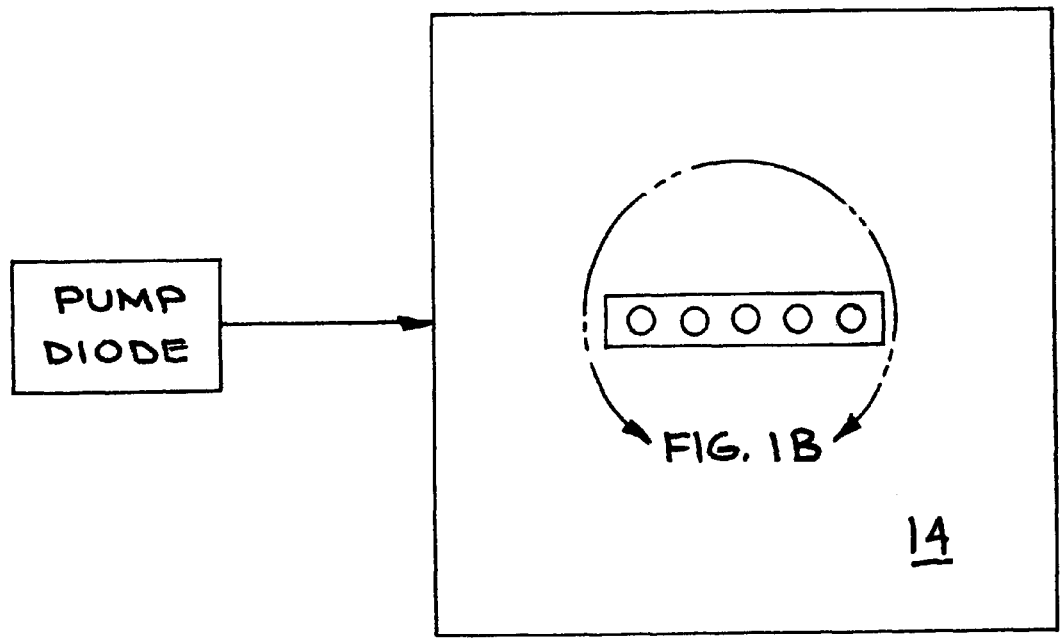
FIGS. 1A and 1B each show a cross-section of a 5-core ribbon, showing a pump-guiding cladding structure surrounding the antiguided region.
Figure 1B:
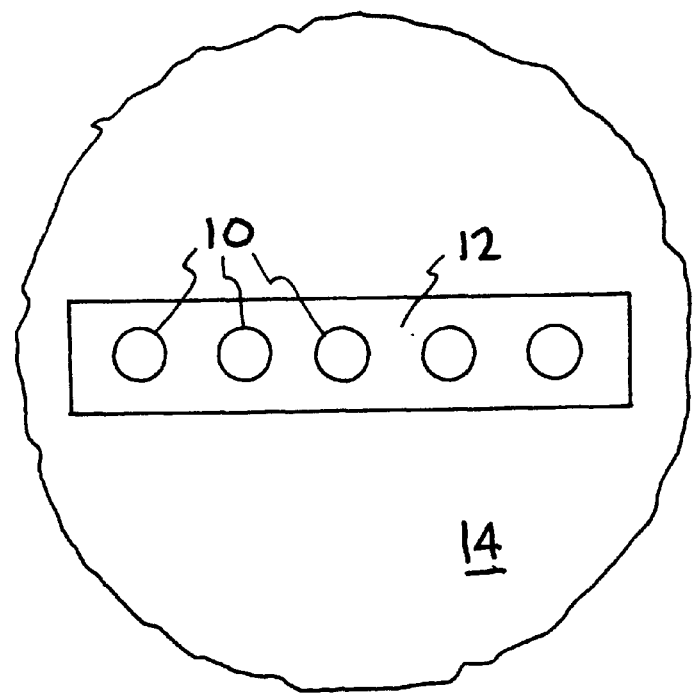

FIGS. 1A and 1B each show a cross-section of a 5-core ribbon, showing a pump-guiding cladding structure surrounding the antiguided-wave region. The core 10 in this embodiment comprises Yb:silica and the cladding 12 comprises Ge:silica. The ribbon is surrounded or embedded within a pump cladding silica region 14. A specific embodiment utilizing this core and cladding configuration has a waveguiding ribbon of Ge:silica and Yb:silica of about 9 $\mu$m height and 60 $\mu$m width. The waveguiding ribbon is embedded within a region 14 of silica that has a height and width of about 350 $\mu$m. In the cladding pumped configuration, the diode pump light is directed into the 350 $\mu$m by 350 $\mu$m region so that it becomes strongly absorbed by the Yb:silica in the waveguide ribbon region.

The ribbon structure is unusual, but similarly complex fiber structures have been made in silica, including linear and annular arrays of doped and undoped, evanescently coupled cores, and a variety of odd-shaped cladding-pumped fibers, bundles, and close-packed matrices. One way to make a ribbon with well-controlled shape and low loss is to fabricate the preform from discrete pieces of silica that are joined together, which can be accomplished in several ways. Means of drawing fibers such that the shape of the preform is preserved have been demonstrated, and commercialized, so the resulting ribbon will reflect the spatial parameters of the preform.

Another object of the invention is to produce an output wave that can be combined with other such lasers, to facilitate construction of a more powerful array and to thus provide more power in a laser beam. Such arrays have been demonstrated in laser diodes, and work is now being done for fibers. There are wavelength division multiplexing (WDM) schemes to add narrow band laser outputs at different wavelengths, and these would work with the proposed, broadly tunable device to increase the available output power. It is conceivable that megawatt powers can be reached by using multiplexing schemes with multicore ribbons.

An energetics model capable of treating multiple core ribbon fibers has been developed. This model is an extension of an existing energetics model that has been used to design, and subsequently has been bench marked against, the performance of a cladding pumped Yb:silica fiber amplifier based on a single gain-loaded core. The code takes the spectrally resolved emission and absorption cross sections of the active laser ion and the geometrical description of the fiber architecture as input and then calculates gain profiles, ASE spectra, and output laser power. The code is written to fully account for the quasi-three level character of the laser ions and includes the physics necessary to describe cladding-pumped fiber architectures. The model has been used to analyze the operation of aYb:silica ribbon laser.

A ribbon fiber containing 100 single mode cores has been analyzed with the aforementioned model. Each core of the 100 single mode cores is about 8 microns in diameter, with the cores distributed in a ribbon waveguide structure that is 10 microns high by 2 mm wide. With this configuration, the optimum placement of laser diode bars is at a spacing of every 50 cm along the length of the ribbon for a core doping concentration of $1 \times 10^{20}/cm^3$. The diodes can be coupled into the pump cladding using either prism couplers or diffraction gratings on the side of the ribbon structure. Assuming each diode produces 40 W of continuous wave (cw) power (a typical value currently), a ribbon fiber length of 250 meters will be required to accept a total of 20 kW of diode pump power. Under these pump conditions and with an assumed loss of $10^{-5}$/cm, the projected output power of the fiber is 12.5 kW or 125 W/core. Thus the ultimate goal of kilowatt powers is not physically prohibited according to this preliminary analysis, and the design parameters are reasonable.

Figure 2:
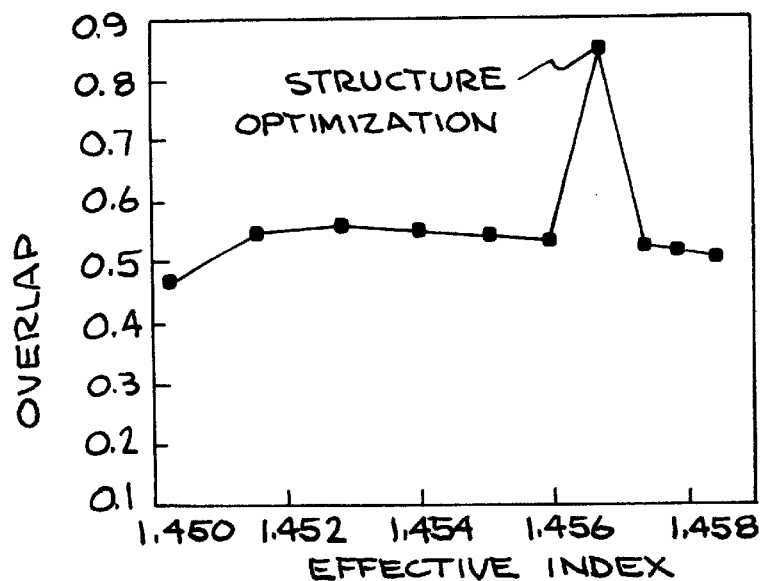
FIG. 2 shows the calculated overlap of the light field with the gain cores as a function of the effective refractive index of the eigenmode.
Figure 3:
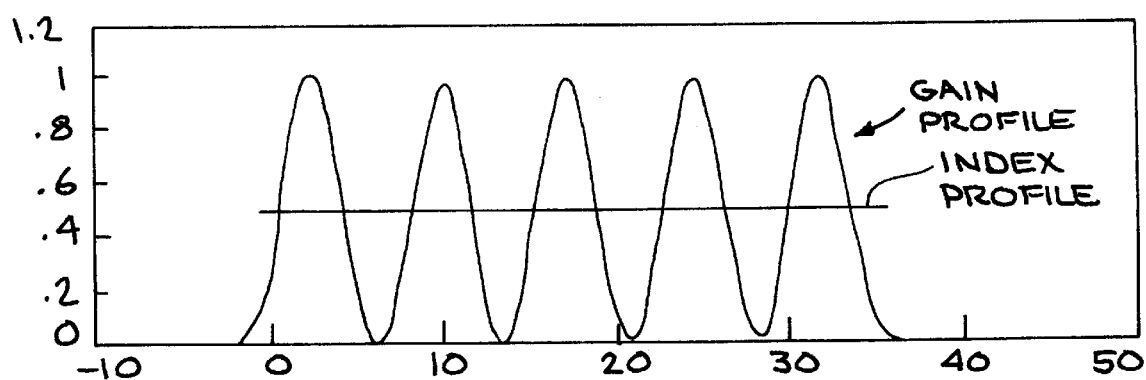
FIG. 3 shows the light intensity in the ribbon fiber for the case of a favorable antiguided eigenmode, overlaid with the location of the gain-loaded regions.

Modeling indicates that the proposed structure favors the desired (antiguided, leaky-wave) mode, and that the scalable characteristics of this structure can be studied with only a few array elements. First studied were the modal propagation constants and modal gains of ideal, i.e., lossless, structures of an infinite number of alternating high and low refractive index regions with gain in the low index regions. When the high and low index regions are of comparable size, the super-mode has about two times the gain of the other modes. Results are shown in FIGS. 2 and 3.

An evaluation was conducted of a five core structure with low refractive index cladding to act as end mirrors to confine the wave laterally. The structure was nearly the same as in FIG. 1. The result is shown in FIG. 3, which gives the overlap function for a five-stripe structure. Very clear modal structure is evident, and a particular mode is strongly favored. The magnitude of each line is proportional to the gain of the corresponding mode. Calculations of this type can accurately determine complex propagation constants. See M. D. Feit and J. A. Fleck, Jr., "A Spectral Approach to Optical Resonator Theory", Applied Optics 20, 2843–51 (Aug. 15, 1981) incorporated herein by reference.

Our preliminary calculations show that the five-stripe structure exhibits modes quite similar to that of the infinite structure. Thus, experience with even such a small structure will prove useful in scaling up to larger sizes.

Figure 4:
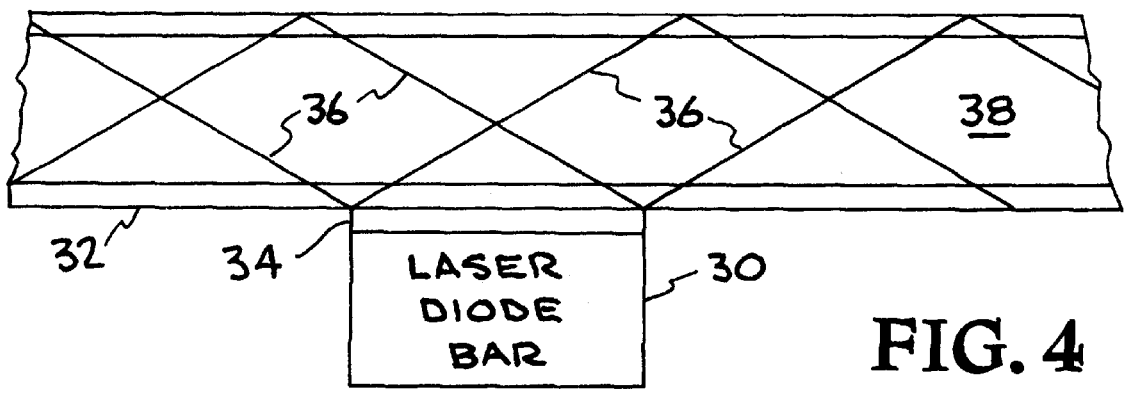
FIG. 4 shows a side pumping mechanism for pumping a ribbon laser/amplifier.
Figure 5:
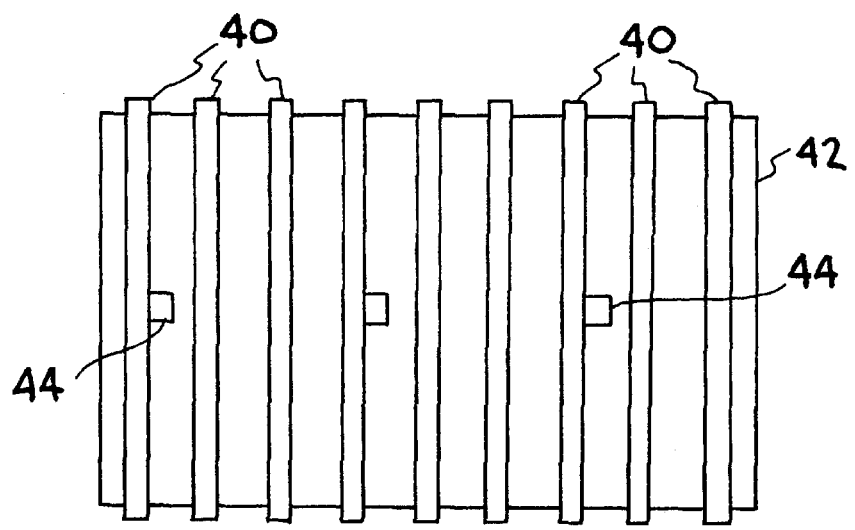
FIG. 5 shows a single ribbon wrapped around a mandrel for purpose of mounting and cooling the laser device.

The proposed ribbon lasers can use a side-pumping scheme, with pumps placed periodically along the fiber. FIG. 4 shows a side pumping mechanism for pumping a ribbon laser/amplifier. A laser diode bar 30 is coupled into the outer cladding 32 with a phase grating 34. Pump light 36 from the diode bar 30 propagates through the outer cladding 32 to optically excite the laser impurity doped cores within the core structure 38. Waveguide structure 38 comprises laser impurity doped cores and index-increasing impurity doped cores. FIG. 5 shows a single ribbon 40 wrapped around a mandrel 42. The ribbon includes laser diode bars 44 periodically spaced along the length of the ribbon. Water may be flowed though the pipe to provide cooling.

Figure 6A:
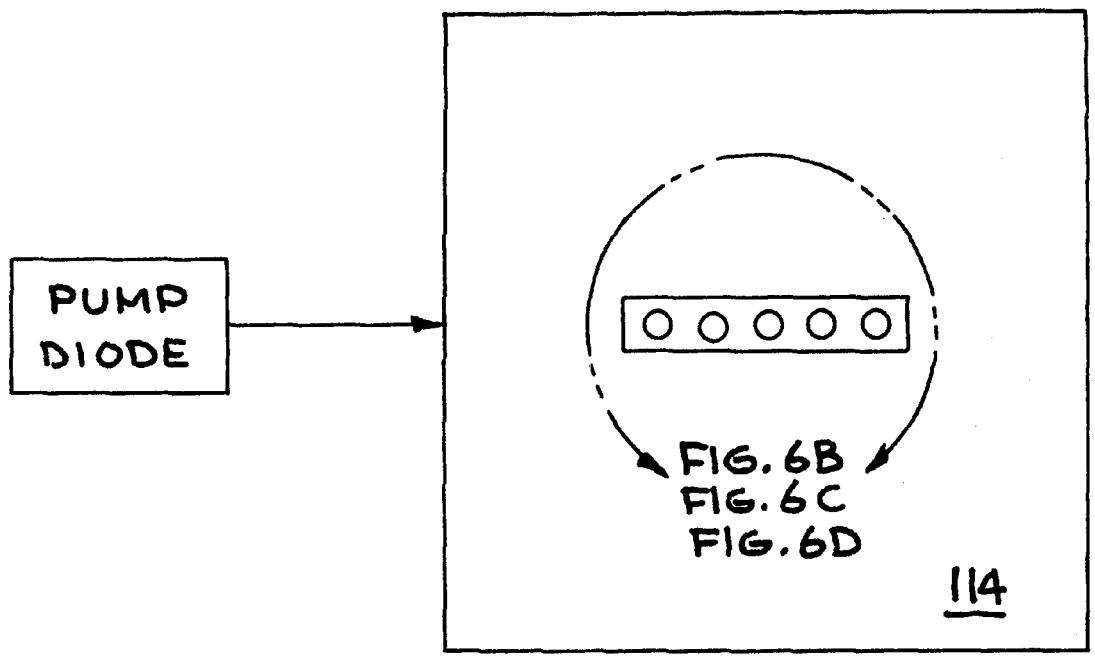
FIG. 6A shows an example of a 5-core ribbon structure.
Figure 6B:
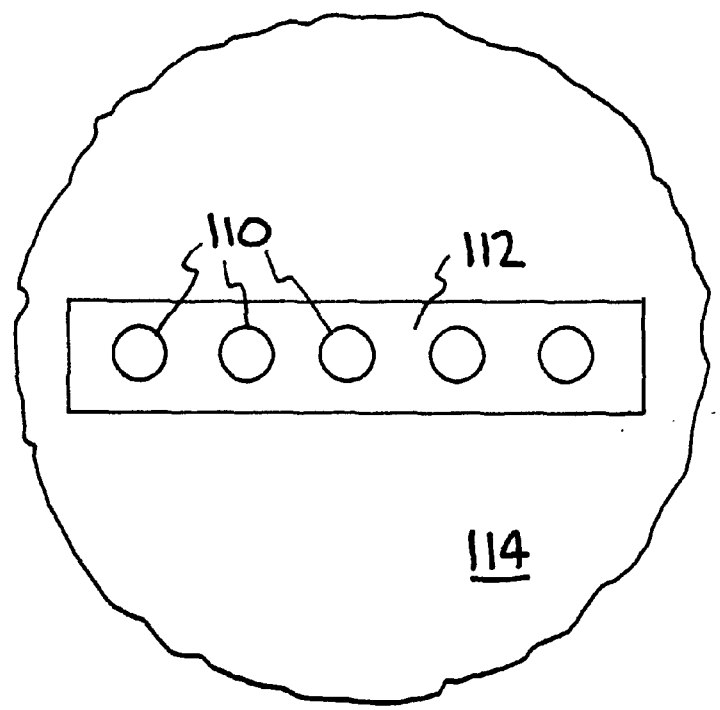
FIG. 6B illustrates an embodiment where the gain-loaded cores have a circular cross-section and are completely surrounded by a non-gain region.
Figure 6C:
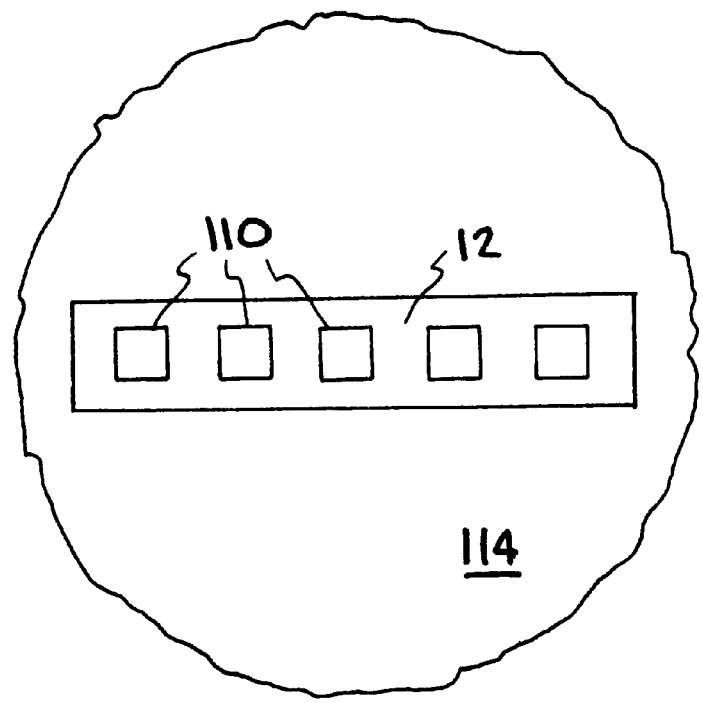
FIG. 6C shows gain-loaded cores having a square or rectangular cross-section that are completely encased within and surrounded by a non-gain region.
Figure 6D:
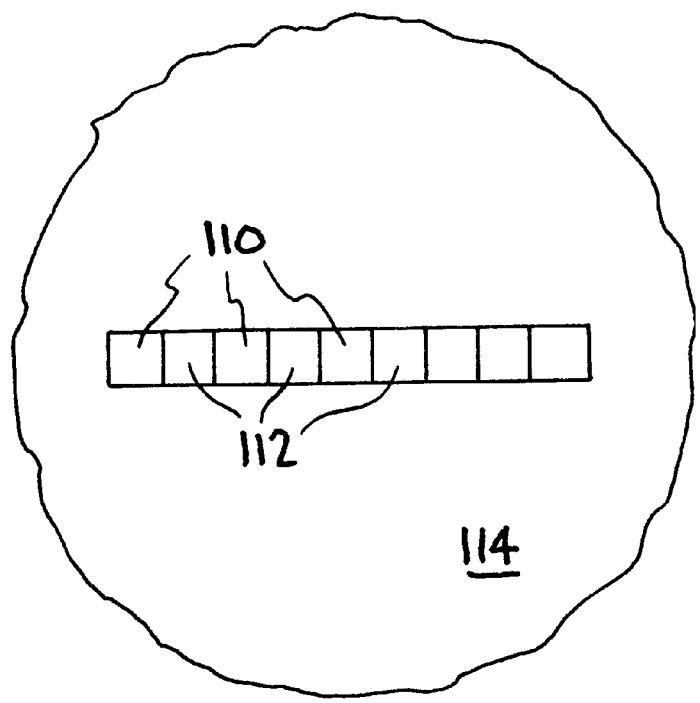
FIG. 6D shows square or rectangular gain regions adjacent to non-gain regions, where the gain and non-gain regions are encased within undoped silica.

FIGS. 6A–D show an example of a 5-core ribbon structure with three difference possible configurations shown for the waveguide region. The figure shows a cross-section of a 5-core ribbon, showing a pump-guiding cladding structure surrounding the antiguided-wave region. The gain-loaded core 110 in this embodiment comprises Yb:silica and the non-gain region 112 comprises Ge:silica. The ribbon is surrounded or embedded within a pump cladding silica region 114. As in FIG. 1, the entire structure may be encased within undoped region 114 as shown in FIG. 6A. In the embodiments shown, undoped region 114 comprises undoped silica. FIG. 6B illustrates an embodiment where the gain-loaded cores 110 have a circular cross-section and are completely surrounded by non-gain region 112. FIG. 6C shows gain-loaded cores 110 having a square or rectangular cross-section that are completely encased within and surrounded by non-gain region 112. FIG. 6D shows square or rectangular gain regions 110 adjacent to non-gain regions 112, where the gain and non-gain regions are encased within the undoped silica 114.

Figure 7:
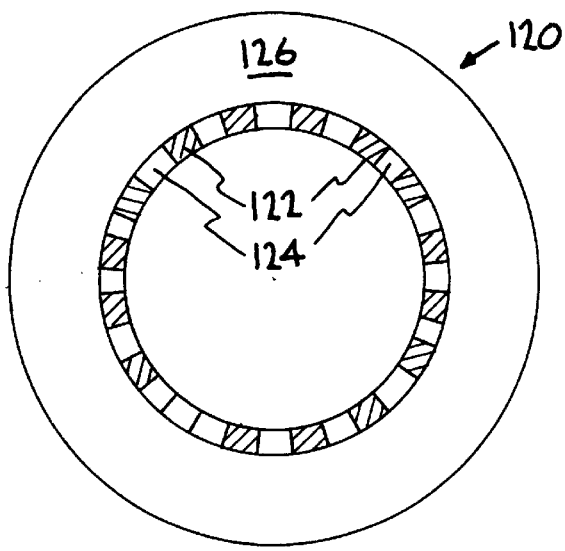
FIG. 7 shows an example of a ribbon fiber with the waveguide region arranged in a circular geometry.
Figure 8A:
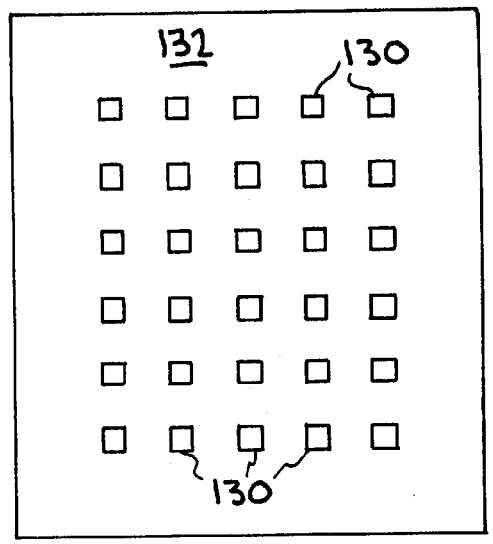
FIG. 8A illustrates a square or rectangular cross-section embodiment having an array of gain loaded cores completely encased within a non-gain region of Ge:silica.
Figure 8B:
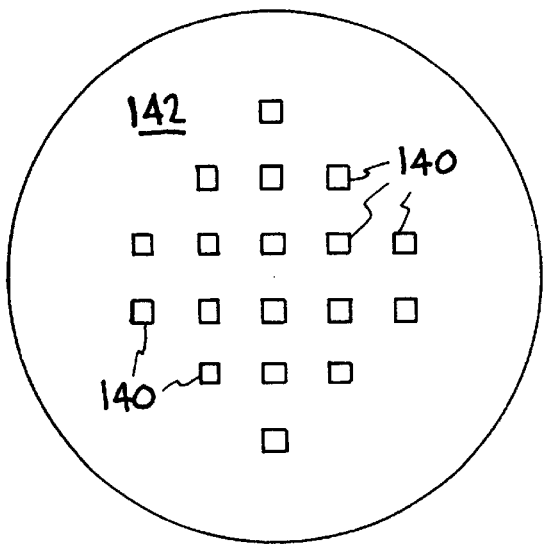
FIG. 8B illustrates a circular cross-section embodiment having an array of gain loaded cores completely encased within a non-gain region of Ge:silica.

FIG. 7 shows an example of a ribbon fiber with the waveguide region arranged in a circular geometry. The figure shows the circular cross-section of a fiber 120. Gain-loaded regions 122 and non-gain regions 124 are located adjacent to one another in a circular configuration. The circular pattern is completely encased within the undoped silica 126. Although the figure illustrates a circular embodiment with square or rectangular cross-sectioned gain and non-gain regions, alternates such as shown in FIGS. 6B and 6C, for example, may be substituted. FIG. 8A illustrates a square or rectangular cross-section embodiment having an array of gain loaded cores 130 completely encased within a non-gain region 132 of Ge:silica. FIG. 8B illustrates a circular cross-section embodiment having an array of gain loaded cores 140 completely encased within a non-gain region 142 of Ge:silica.

The foregoing description of the invention has been presented for purposes of illustration and description and is not intended to be exhaustive or to limit the invention to the precise form disclosed. Many modifications and variations are possible in light of the above teaching. The embodiments were chosen and described to best explain the principles of the invention and its practical application to thereby enable others skilled in the art to best use the invention in various embodiments and with various modifications suited to the particular use contemplated. The scope of the invention is to be defined by the following claims.

We claim:

1. An antiguiding light amplifier, comprising:
   a dielectric waveguide comprising at least two gain regions spatially separated by at least one non-gain region, wherein said at least two gain regions comprise a first index of refraction, wherein said non-gain region comprises a second index of refraction, wherein said first index of refraction is equal to or less than said second index of refraction;
   a cladding surrounding said waveguide, wherein said cladding comprises a third index of refraction that is less than said first index of refraction and said second index of refraction; and
   means for optically pumping said at least two gain regions.

2. The antiguiding light amplifier of claim 1, wherein said waveguide is configured as a ribbon.

3. The antiguiding light amplifier of claim 2, wherein said at least two gain regions and said at least one non-gain region run the length of said ribbon.

4. The antiguiding light amplifier of claim 1, wherein said means for optically pumping said at least two gain regions comprises a laser diode.

5. The antiguiding light amplifier of claim 1, further comprising means for optically pumping said cladding.

6. The antiguiding light amplifier of claim 1, wherein said a waveguide comprises a plurality of gain regions, wherein each gain region is spatially separated from other gain regions by at least one non-gain region.

7. The antiguiding light amplifier of claim 1, wherein said at least two gain regions are arranged in a linear array.

8. The antiguiding light amplifier of claim 1, wherein said at least two gain regions are arranged in a two-dimensional pattern and fill a 2-dimensional area.

9. The antiguiding light amplifier of claim 1, wherein said at least two gain regions promote antiguiding and leaky modes.

10. The antiguiding light amplifier of claim 1, wherein said means for optically pumping said at least two gain regions comprises means for side pumping said at least two gain regions.

11. The antiguiding light amplifier of claim 1, wherein said at least two gain regions comprise more than 5 gain regions.

12. The antiguiding light amplifier of claim 1, wherein said waveguide comprises silica.

13. The antiguiding light amplifier of claim 1, wherein said at least two gain regions comprise silica doped with a rare earth ion.

14. The antiguiding light amplifier of claim 13, wherein said rare earth ion comprises Yb.

15. The antiguiding light amplifier of claim 1, wherein said at least one non-gain regions comprise silica doped with Ge.

16. The antiguiding light amplifier of claim 1, wherein said non-gain region comprises material selected from the group consisting of phosphate glass and fluoride glass.

17. The antiguiding light amplifier of claim 10, wherein said means for side pumping comprise at least one laser diode bar.

18. The antiguiding light amplifier of claim 10, wherein said means for side pumping comprise a plurality of laser diode bars.

19. The antiguiding light amplifier of claim 18, wherein each laser diode bar of said plurality of laser diode bars is periodically spaced along said waveguide.

20. The antiguiding light amplifier of claim 16, wherein each said laser diode bar is coupled into said cladding using a coupling mechanism selected from the group consisting of a prism coupler and a diffraction grating.

21. The antiguiding light amplifier of claim 1, wherein said third index of refraction is substantially less than said first index of refraction and said second index of refraction.

22. An antiguiding light amplifier, comprising:

a dielectric waveguiding region comprising at least two gain regions spatially separated by at least one non-gain region, wherein said at least two gain regions comprise an index of refraction that is equal to that of said non-gain region, wherein said waveguiding region is surrounded by a cladding region with a refractive index that is less that that of said waveguiding region; and means for optically pumping said at least two gain regions.

23. An antiguiding fiber light amplifier, comprising:

a dielectric waveguiding region comprising at least two gain regions spatially separated by at least one non-gain region, wherein said at least two gain regions comprise an index of refraction that is less than that of said non-gain region, wherein said waveguiding region is surrounded by a cladding region with a refractive index that is less that that of said waveguiding region; and means for optically pumping said at least two gain regions.

24. A method for making an antiguiding light amplifier, comprising:

providing a dielectric waveguide comprising at least two gain regions spatially separated by at least one non-gain region, wherein said at least two gain regions comprise a first index of refraction, wherein said non-gain region comprises a second index of refraction, wherein said first index of refraction is equal to or less than said second index of refraction;

providing a cladding surrounding said waveguide, wherein said cladding comprises a third index of refraction that is less than said first index of refraction and said second index of refraction; and providing means for optically pumping said at least two gain regions.

25. The Antiguiding method of claim 24, further comprising providing means for optically pumping said cladding.

* * * * *